United States Patent
Wang et al.

(10) Patent No.: US 10,805,007 B2
(45) Date of Patent: Oct. 13, 2020

(54) ETHERNET PASSIVE OPTICAL NETWORK COMMUNICATION METHOD, OPTICAL NETWORK UNIT, AND OPTICAL LINE TERMINAL

(71) Applicant: Huawei Technologies Co., Ltd., Shenzhen (CN)

(72) Inventors: Zhenping Wang, Shenzhen (CN); Bo Gao, Wuhan (CN); Shiwei Nie, Dongguan (CN); Lei Jing, Wuhan (CN); Xuming Wu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/298,677

(22) Filed: Mar. 11, 2019

(65) Prior Publication Data

US 2019/0207680 A1   Jul. 4, 2019

Related U.S. Application Data

(63) Continuation of application No. PCT/CN2016/098736, filed on Sep. 12, 2016.

(51) Int. Cl.
*H04B 10/27* (2013.01)
*H04L 29/06* (2006.01)
(Continued)

(52) U.S. Cl.
CPC ............ *H04B 10/27* (2013.01); *H04J 14/08* (2013.01); *H04L 29/06* (2013.01); *H04L 61/6022* (2013.01)

(58) Field of Classification Search
CPC .................... H04L 12/2885; H04L 12/66
See application file for complete search history.

(56) References Cited

U.S. PATENT DOCUMENTS

2003/0133460 A1\*  7/2003  Lee ................. H04Q 11/0067
                                                           370/395.43
2005/0047783 A1\*  3/2005  Sisto ................... H04L 47/808
                                                                398/71
(Continued)

FOREIGN PATENT DOCUMENTS

CN       1767693 A       5/2006
CN       1791039 A       6/2006
(Continued)

OTHER PUBLICATIONS

IEEE Std 802.3ah-2004, Part 3: Carrier Sense Multiple Access with Collision Detection (CSMA/CD) Access Method and Physical Layer Specifications. Amendment: Media Access Control Parameters, Physical Layers, and Management Parameters for Subscriber Access Networks. 640 pages.

*Primary Examiner* — Tanya T Motsinger
(74) *Attorney, Agent, or Firm* — Slater Matsil, LLP

(57) ABSTRACT

Embodiments of the present invention disclose an EPON communication method, an ONU, and an OLT. The method includes: generating, by an ONU, a first control frame, where the first control frame includes a first data field, and the first data field includes a bandwidth requirement of the at least one LLID; and sending, by the ONU, the first control frame to an OLT. In addition, the OLT generates a second control frame, where the second control frame includes a second data field, and the second data field includes grant information of the at least one LLID; and the OLT sends the second control frame to the ONU. In the embodiments of the present invention, the first control frame may carry bandwidth requirements of a plurality of LLIDs, so that one first control frame can be used to report bandwidth requirements of a plurality of LLIDs.

15 Claims, 16 Drawing Sheets

(51) Int. Cl.
*H04J 14/08* (2006.01)
*H04L 29/12* (2006.01)

(56) References Cited

U.S. PATENT DOCUMENTS

| | | | | |
|---|---|---|---|---|
| 2005/0058135 A1* | 3/2005 | Sisto | ................... | H04L 47/2425 370/395.2 |
| 2005/0074238 A1* | 4/2005 | Sung | ....................... | H04L 47/10 398/58 |
| 2005/0100036 A1* | 5/2005 | Davis | ................. | H04Q 11/0067 370/432 |
| 2007/0237177 A1* | 10/2007 | Endo | .................. | H04Q 11/0071 370/468 |
| 2010/0074628 A1 | 3/2010 | Murakami et al. | | |
| 2010/0098407 A1* | 4/2010 | Goswami | ............. | H04B 10/272 398/5 |
| 2010/0254706 A1* | 10/2010 | Hirth | ................... | H04J 14/0239 398/48 |
| 2012/0128349 A1* | 5/2012 | Mitsunaga | .......... | H04J 14/0268 398/25 |
| 2014/0099113 A1* | 4/2014 | Fang | ..................... | H04B 10/27 398/66 |
| 2014/0112659 A1* | 4/2014 | Kawamura | ........ | H04B 10/0773 398/33 |
| 2014/0133855 A1* | 5/2014 | Chaffins | ............. | H04Q 11/0067 398/58 |
| 2014/0133859 A1* | 5/2014 | Fang | .................. | H04Q 11/0071 398/76 |
| 2015/0195039 A1* | 7/2015 | Chu | ................... | H04Q 11/0071 398/66 |
| 2016/0285555 A1* | 9/2016 | Wu | ................... | H04Q 11/0067 |
| 2019/0207680 A1* | 7/2019 | Wang | ................... | H04L 29/06 |

FOREIGN PATENT DOCUMENTS

| | | |
|---|---|---|
| CN | 101277320 A | 10/2008 |
| CN | 101692716 A | 4/2010 |
| CN | 103813219 A | 5/2014 |
| CN | 105530201 A | 4/2016 |
| EP | 1786149 A1 | 5/2007 |

\* cited by examiner

SNI: Service node interface  UNI: User network interface  ODN: Optical distribution network

| 6 bytes | 6 | 2 | 2 | 4 | 40 | 4 |
|---|---|---|---|---|---|---|
| Destination address (DA) | Source address (SA) | Length/ type (L/T) | Operation code (Opcode) | Time stamp (Time stamp) | Data/pad (Data/Pad) | Verification code (FCS) |

Data/pad field includes:

| | | | | | |
|---|---|---|---|---|---|
| Grant number/flag (Grant Number/flag) | 1 byte | Grant number/flag (Grant Number/flag) | 1 byte | Number of queue sets (Queue Sets number) | 1 byte |
| Grant #1 start time (Grant #1 start time) | 0/4 | Grant #1 start time (Grant #1 start time) | 4 | Report bitmap (Report bitmap) | 0/1 |
| Grant #1 length (Grant #1 length) | 0/2 | Synchronization time (sync time) | 2 | Queue #0 report (Queue #0 report) | 0/2 |
| Grant #2 start time (Grant #1 start time) | 0/4 | Discovery information (Discovery Information) | 2 | ... | |
| Grant #2 length (Grant #1 length) | 0/2 | Pad/reserved (Pad/Reserved) | 29 | Queue #7 report (Queue #7 report) | 0/2 |
| Grant #3 start time (Grant #1 start time) | 0/4 | | | Report bitmap (Report bitmap) | 0/1 |
| Grant #3 length (Grant #1 length) | 0/2 | | | Queue #0 report (Queue #0 report) | 0/2 |
| Grant #4 start time (Grant #1 start time) | 0/4 | | | ... | |
| Grant #4 length (Grant #1 length) | 0/2 | | | Queue #7 report (Queue #7 report) | 0/2 |
| Pad/reserved (Pad/Reserved) | 15 to 39 | | | ... | 0/2 |
| | | | | Pad/reserved (Pad/Reserved) | 0 to 39 |

Gate frame (operation code Opcode=0x0002)

Report frame (operation code Opcode=0x0003)  N queue sets in total, and N=Number of queue sets

FIG. 4

| 6 bytes | 6 | 2 | 2 | 4 | 40 | 4 |
|---|---|---|---|---|---|---|
| Destination address (DA) | Source address (SA) | Length/ type (L/T) | Operation code (Opcode) | Time stamp (Time stamp) | Data/pad (Data/Pad) | Verification code (FCS) |

| | |
|---|---|
| Destination address (DA) | 6 |
| Source address (SA) | 6 |
| Length/type=0x8808 (L/T) | 2 |
| Operation code (Opcode)=0x003 | 2 |
| Time stamp (Time stamp) | 4 |
| Number of queue sets (Queue Sets number) | 1 |
| Report bitmap (Report bitmap) | 1 |
| Queue #0 report (Queue #0 report) | 0/2 |
| Queue #1 report (Queue #1 report) | 0/2 |
| Queue #2 report (Queue #2 report) | 0/2 |
| Queue #3 report (Queue #3 report) | 0/1 |
| Queue #4 report (Queue #4 report) | 0/2 |
| Queue #5 report (Queue #5 report) | 0/2 |
| Queue #6 report (Queue #6 report) | 0/2 |
| Queue #7 report (Queue #7 report) | 0/2 |
| Pad/reserved (Pad/Reserved) | 0 to 39 |
| Verification code (FCS) | 4 |

EPON report frame

| | |
|---|---|
| Destination address (DA) | 6 |
| Source address (SA) | 6 |
| Length/type=0x8808 (L/T) | 2 |
| Operation code (Opcode)=0x009 | 2 |
| Time stamp (Time stamp) | 4 |
| Number of queue sets (Number of Queue Sets) | 1 |
| Report bitmap (Report bitmap) | 2 |
| LLID #0 report (LLID #0 report) | 2 |
| LLID #1 report (LLID #1 report) | 2 |
| ... | |
| LLID #n−1 report (LLID #n−1 report) | 2 |
| Pad/reserved (Pad/Reserved) | 0 to 39 |
| Verification code (FCS) | 4 |

New report frame — N reports in total, and N=Report bitmap

FIG. 7

| | | | | |
|---|---|---|---|---|
| Destination address (DA) | 6 | Destination address (DA) | 6 | |
| Source address (SA) | 6 | Source address (SA) | 6 | |
| Length/type=0x8808 (L/T) | 2 | Length/type=0x8808 (L/T) | 2 | |
| Operation code (Opcode)=0x002 | 2 | Operation code (Opcode)=0x008 | 2 | |
| Time stamp (Time stamp) | 4 | Time stamp (Time stamp) | 4 | |
| Grant number/flag (Grant Number/flag) | 1 byte | LLID grant bitmap (LLID grant bitmap) | 0/2 | |
| Grant #1 start time (Grant #1 start time) | 0/4 | Force report bitmap (Force report bitmap) | 0/2 | |
| Grant #1 length (Grant #1 length) | 0/2 | Grant start time (Grant start time) | 0/4 | |
| Grant #2 start time (Grant #1 start time) | 0/4 | LLID 0 grant length (LLID #0 grant length) | 0/2 | |
| Grant #2 length (Grant #1 length) | 0/2 | LLID 1 grant length (LLID #1 grant length) | 0/2 | N grant lengths in total, and N is determined by the LLID grant bitmap |
| Grant #3 start time (Grant #1 start time) | 0/4 | ... | 0/2 | |
| Grant #3 length (Grant #1 length) | 0/2 | LLID n−1 grant length (LLID #n−1 grant length) | 0/2 | |
| Grant #4 start time (Grant #1 start time) | 0/4 | Pad/reserved (Pad/Reserved) | 0 to 32 | |
| Grant #4 length (Grant #1 length) | 0/2 | Verification code (FCS) | 4 | |
| Pad/reserved (Pad/Reserved) | 13 to 39 | New gate frame | | |
| Verification code (FCS) | 4 | | | |

EPON gate frame

FIG. 8

| EPON report frame | |
|---|---|
| Destination address (DA) | 6 |
| Source address (SA) | 6 |
| Length/type=0x8808 (L/T) | 2 |
| Operation code (Opcode)=0x003 | 2 |
| Time stamp (Time stamp) | 4 |
| Number of queue sets (Queue Sets number) | 1 |
| Report bitmap (Report bitmap) | 1 |
| Queue #0 report (Queue #0 report) | 0/2 |
| Queue #1 report (Queue #1 report) | 0/2 |
| Queue #2 report (Queue #2 report) | 0/2 |
| Queue #3 report (Queue #3 report) | 0/1 |
| Queue #4 report (Queue #4 report) | 0/2 |
| Queue #5 report (Queue #5 report) | 0/2 |
| Queue #6 report (Queue #6 report) | 0/2 |
| Queue #7 report (Queue #7 report) | 0/2 |
| Pad/reserved (Pad/Reserved) | 0 to 39 |
| Verification code (FCS) | 4 |

EPON report frame

| New report frame | |
|---|---|
| Destination address (DA) | 6 |
| Source address (SA) | 6 |
| Length/type=0x8808 (L/T) | 2 |
| Operation code (Opcode)=0x009 | 2 |
| Time stamp (Time stamp) | 4 |
| Group number (Group number) | 1 |
| Number of queue sets (Number of Queue Sets) | 1 |
| Report bitmap (Report bitmap) | 2 |
| LLID #0 report (LLID #0 report) | 2 |
| ... | |
| LLID #n−1 report (LLID #n−1 report) | 2 |
| LLID #0 report (LLID #0 report) | 2 |
| ... | |
| LLID #n−1 report (LLID #n−1 report) | 2 |
| Pad/reserved (Pad/Reserved) | 1 to 35 |
| Verification code (FCS) | 4 |

New report frame — N queue sets in total, N=Number of queue sets, and there are two queue sets in the figure

FIG. 9

| EPON gate frame | |
|---|---|
| Destination address (DA) | 6 |
| Source address (SA) | 6 |
| Length/type=0x8808 (L/T) | 2 |
| Operation code (Opcode)=0x002 | 2 |
| Time stamp (Time stamp) | 4 |
| Grant number/flag (Grant Number/flag) | 1 byte |
| Grant #1 start time (Grant #1 start time) | 0/4 |
| Grant #1 length (Grant #1 length) | 0/2 |
| Grant #2 start time (Grant #1 start time) | 0/4 |
| Grant #2 length (Grant #1 length) | 0/2 |
| Grant #3 start time (Grant #1 start time) | 0/4 |
| Grant #3 length (Grant #1 length) | 0/2 |
| Grant #4 start time (Grant #1 start time) | 0/4 |
| Grant #4 length (Grant #1 length) | 0/2 |
| Pad/reserved (Pad/Reserved) | 13 to 39 |
| Verification code (FCS) | 4 |

EPON gate frame

| New gate frame | | |
|---|---|---|
| Destination address (DA) | 6 | |
| Source address (SA) | 6 | |
| Length/type=0x8808 (L/T) | 2 | |
| Operation code (Opcode)=0x008 | 2 | |
| Time stamp (Time stamp) | 4 | |
| Grant group number (Grant group number) | 0/1 | |
| LLID grant bitmap (LLID grant bitmap) | 0/2 | |
| Force grant bitmap (Force report bitmap) | 0/2 | |
| Grant start time (Grant start time) | 0/4 | |
| LLID 0 grant length (LLID #0 grant length) | 0/2 | |
| LLID 1 grant length (LLID #1 grant length) | 0/2 | |
| ... | 0/2 | N grant lengths in total, and N is determined by the LLID grant bitmap |
| LLID n−1 grant length (LLID #n−1 grant length) | 0/2 | |
| Pad/reserved (Pad/Reserved) | 1 to 35 | |
| Verification code (FCS) | 4 | |

New gate frame

FIG. 10

| | |
|---|---|
| Destination address (DA) | 6 |
| Source address (SA) | 6 |
| Length/type=0x8809 (L/T) | 2 |
| Subtype (Subtype)=0x003 | 1 |
| Flag (flags) | 2 |
| Code (Code=0x05) | 1 |
| Group number (Group number) | 1 |
| Number of LLIDs (Number of LLIDs) | 1 |
| LLID 0 | 2 |
| LLID 1 | 2 |
| LLID 2 | 2 |
| ... | |
| LLID n–1 | 2 |
| Pad/reserved (Pad/Reserved) | 40 to 1494 |
| Verification code (FCS) | 4 |

OAM frame

FIG. 11

| | |
|---|---|
| Destination address (DA) | 6 |
| Source address (SA) | 6 |
| Length/type=0x8808 (L/T) | 2 |
| Operation code (Opcode)=0x00A | 2 |
| Time stamp (Timestamp) | 4 |
| Group number (Group number) | 1 |
| Number of LLIDs (Number of LLIDs) | 1 |
| LLID index start value (LLID index start) | 2 |
| Number of LLIDs (LLID length) | 2 |
| LLID 0 | 2 |
| LLID 1 | 2 |
| ... | |
| LLID n−1 | 2 |
| Pad/reserved (Pad/Reserved) | 1 to 35 |
| Verification code (FCS) | 4 |

MPCP frame

FIG. 12

| | |
|---|---|
| Destination address (DA) | 6 |
| Source address (SA) | 6 |
| Length/type=0x8809 (L/T) | 2 |
| Subtype (Subtype)=0x003 | 1 |
| Flag (flags) | 2 |
| Code (Code=0x05) | 1 |
| MAC number (MAC number) | 1 |
| Registration flag 0 (Reg flag 0) | 1 |
| MAC 0 | 2 |
| Registration flag 1 (Reg flag 1) | 1 |
| MAC 1 | 2 |
| ... | |
| Registration flag (n−1) (Reg flag (n−1)) | 1 |
| MAC (n−1) | 2 |
| Pad/reserved (Pad/Reserved) | 40 to 1494 |
| Verification code (FCS) | 4 |

ONU reports OAM

FIG. 14

| | |
|---|---|
| Destination address (DA) | 6 |
| Source address (SA) | 6 |
| Length/type=0x8809 (L/T) | 2 |
| Subtype (Subtype)=0x003 | 1 |
| Flag (flags) | 2 |
| Code (Code=0x05) | 1 |
| Number of LLIDs (LLID number) | 1 |
| Registration flag 0 (Reg flag 0) | 1 |
| LLID 0 | 2 |
| Registration flag 1 (Reg flag 1) | 1 |
| LLID 1 | 2 |
| ... | |
| Registration flag (n–1) (Reg flag (n–1)) | 1 |
| LLID (n–1) | 2 |
| Pad/reserved (Pad/Reserved) | 40 to 1494 |
| Verification code (FCS) | 4 |

OLT configures OAM

FIG. 15

ETHERNET PASSIVE OPTICAL NETWORK COMMUNICATION METHOD, OPTICAL NETWORK UNIT, AND OPTICAL LINE TERMINAL

CROSS-REFERENCE TO RELATED APPLICATIONS

This application is a continuation of International Patent Application No. PCT/CN2016/098736, filed on Sep. 12, 2016, which is hereby incorporated by reference in its entireties.

TECHNICAL FIELD

The present invention relates to the field of optical communications, and in particular, to an Ethernet passive optical network communication method, an optical network unit, and an optical line terminal.

BACKGROUND

Ethernet passive optical network (EPON)-related technologies and standards are all developed based on IEEE 802.3, are compatible with ubiquitous ETH technologies and devices, and can reuse a large quantity of existing mature devices and circuits. Therefore, design implementations have low risk, and the technologies and an industry chain are relatively mature and are low in costs.

Based on an EPON point-to-multipoint network structure, one optical line terminal (OLT for short) communicates with a plurality of optical network units (ONU) at the same time. To distinguish between different ONUs, a unique logical link identity (LLID) is set for each ONU as an identifier of the ONU.

In addition, there is a multi-LLID scenario, to be specific, a plurality of LLIDs are all allocated to one ONU, and each LLID independently registers with the OLT and performs normal data service forwarding with the OLT. Each LLID may be considered as one virtual ONU that logically exists.

Because a plurality of ONUs send data to the OLT at the same time, a signal conflict may occur, affecting normal sending for the OLT. Therefore, the OLT needs to coordinate, in a time slice grant manner, sending by the ONUs, to ensure that only one ONU is allowed to send data in a time period. This can effectively avoid a conflict. The EPON standards define a Multi-Point Control Protocol (MPCP), to implement registration of the ONU, and control and coordinate different ONUs to share a passive optical network (PON) in a Time Division Multiple Access (TDMA) manner to send uplink data.

Related requirements for an LLID working mode of an EPON system in the China Telecom standard include: each LLID has an independent Media Access Control (MAC) address, and each LLID should support a normal MPCP discovery and registration process, and support normal gate message processing and report message reporting.

Bandwidth efficiency has always been a difficult problem that affects an EPON protocol (including an EPON and a 10 G EPON). Overheads of an EPON system mainly include burst overheads, MPCP frame overheads, grant tail bit overheads, and forward error correction (FEC) overheads.

In the EPON standards, a plurality of grants (Grant) of one LLID are encapsulated in one gate frame defined in the standards, and queues of one LLID are encapsulated in one report frame. When an ONU having a multi-LLID capability needs to be supported in being connected to the OLT, the gate frame and the report frame need to be sent for a plurality of times. Therefore, bandwidth efficiency is low.

SUMMARY

Embodiments of the present invention provides an Ethernet passive optical network communication method, an optical network unit, and an optical line terminal, to improve bandwidth efficiency in a multi-LLID mode in an EPON.

According to a first aspect, an embodiment of the present invention provides an Ethernet passive optical network communication method. The method includes generating, by an optical network unit (ONU), a first control frame. The first control frame includes a first data field, and the first data field includes a bandwidth requirement of the at least one logical link identity LLID. The method further includes sending, by the ONU, the first control frame to an optical line terminal (OLT).

In this embodiment of the present invention, the first control frame may be a report frame, one report frame may carry reports of a plurality of LLIDs, and a report of each LLID is a sum of bandwidth requirements of uplink queues of the LLID. Therefore, one report frame can be used to report bandwidth requirements of a plurality of LLIDs, thereby improving bandwidth efficiency.

With reference to the first aspect, in a first possible implementation of the first aspect, the method further includes receiving, by the ONU, a second control frame sent by the OLT, where the second control frame includes a second data field, and the second data field includes grant information of the at least one LLID.

In this embodiment of the present invention, the second control frame may be a gate frame, and one gate frame can be used to grant a plurality of LLIDs in one ONU, so that an MPCP frame can be fully utilized, and one frame can carry more useful information, thereby saving a bandwidth.

With reference to the first aspect, in a second possible implementation of the first aspect, that the first data field includes a bandwidth requirement of the at least one LLID includes: the first data field includes a report bitmap and an LLID report of each of the at least one LLID, where one bit in the report bitmap is used to indicate whether one of the at least one LLID has an LLID report.

With reference to the second possible implementation of the first aspect, in a third possible implementation of the first aspect, the first data field further includes the number of queue sets. The number of queue sets is used to indicate a quantity of LLID queue sets in the first data field, and one LLID queue set includes the report bitmap and the LLID report of each of the at least one LLID.

In this embodiment of the present invention, the report frame includes the number of queue sets, and one LLID queue set corresponds to one group of LLID report thresholds, so that concepts and usage of a report threshold and a queue set in the current system are retained, and one report frame can carry more useful information, thereby improving bandwidth efficiency.

With reference to the first possible implementation of the first aspect, in a fourth possible implementation of the first aspect, that the second data field includes grant information of the at least one LLID includes: the second data field includes a bandwidth grant start time and a bandwidth grant length of each of the at least one LLID.

It should be noted that bandwidth grant lengths of all of the at least one LLID are back to back, and the at least one LLID is combined to perform one burst.

In this embodiment of the present invention, grants of a plurality of LLIDs in the gate frame are back to back. Therefore, the grants of the plurality of LLIDs can be combined to perform one burst, thereby reducing burst overheads of the MPCP frame.

With reference to the fourth possible implementation of the first aspect, in a fifth possible implementation of the first aspect, the second data field further includes an LLID grant bitmap and a force report bitmap. One bit in the LLID grant bitmap is used to indicate whether one of the at least one LLID has a bandwidth grant, and one bit in the force report bitmap is used to indicate whether one of the at least one LLID is forced to send a bandwidth requirement in a corresponding grant time window.

With reference to the fourth or the fifth possible implementation of the first aspect, in a sixth possible implementation of the first aspect, in the second data field, each of the at least one LLID corresponds to one bandwidth grant length.

In this embodiment of the present invention, each LLID corresponds to one grant time window, thereby resolving a bandwidth waste problem that one gate frame carries a plurality of grants (grant) of a same LLID.

With reference to any possible implementation of the first aspect, in a seventh possible implementation of the first aspect, the method further includes registering, by the ONU, with the OLT by using a first MAC address, to obtain a first LLID; sending, by the ONU, a first OAM frame to the OLT, where the first OAM frame includes another MAC address supported by the ONU; receiving, by the ONU, a second OAM frame sent by the OLT, where the second OAM frame includes another LLID configured by the OLT for the another MAC address; and configuring, by the ONU, the another LLID based on the second OAM frame, where the at least one LLID is an LLID in a set including the first LLID and the another LLID.

In this way, in this embodiment of the present invention, an ONU having a multi-LLID capability registers by using base MAC (MAC o), and enabling and deregistration of another LLID are configured and completed by using an OAM message. Therefore, a registration mechanism of the ONU having the multi-LLID capability can be simplified, and compared with an LLID negotiation process in an ONU initialization phase shown in FIG. 3 in the current system, this method can improve registration efficiency and bandwidth efficiency.

With reference to the seventh possible implementation of the first aspect, in an eighth possible implementation of the first aspect, the ONU supports a multi-wavelength channel, and a same LLID is configured for MAC addresses of different channels associated with a same service flow.

In this way, a cross-wavelength LLID that may be generated by a plurality of LLIDs can be used to implement channel bonding, so that a same service flow can be offloaded to different channels, thereby increasing a peak bandwidth of a single user.

With reference to any possible implementation of the first aspect, in a ninth possible implementation of the first aspect, the method further includes receiving, by the ONU, group information sent by the OLT. The group information includes a plurality of group numbers, the number of LLIDs in each group, and an LLID in each group. The method further includes storing, by the ONU, the group information, where the first control frame and the second control frame each further include a first group number, where the first group number is one of the plurality of group numbers, and the at least one LLID is an LLID in a group corresponding to the first group number.

In an optional implementation, the group information is carried in a third OAM frame.

In an optional implementation, alternatively, the group information is carried in at least one MPCP frame.

In this embodiment of the present invention, when one MPCP frame cannot carry information about all LLIDs supported by the ONU, the OLT divides all the LLIDs supported by the ONU into groups, processes one group in each frame, and defines a group information transfer message, to establish or refresh an LLID group. Therefore, an EPON protocol theory can be inherited, and the solution in this embodiment of the present invention can be further improved.

According to a second aspect, an embodiment of the present invention provides an Ethernet passive optical network communication method. The method includes generating, by an OLT, a second control frame, where the second control frame includes a second data field, and the second data field includes grant information of the at least one LLID; and sending, by the OLT, the second control frame to an ONU.

With reference to the second aspect, in a first possible implementation of the second aspect, the method further includes receiving, by the OLT, a first control frame sent by the ONU. The first control frame includes a first data field, and the first data field includes a bandwidth requirement of the at least one LLID.

With reference to the first possible implementation of the second aspect, in a second possible implementation of the second aspect, that the first data field includes a bandwidth requirement of the at least one LLID includes the first data field includes a report bitmap and an LLID report of each of the at least one LLID, where one bit in the report bitmap is used to indicate whether one of the at least one LLID has an LLID report.

With reference to the second possible implementation of the second aspect, in a third possible implementation of the second aspect, the first data field further includes the number of queue sets, where the number of queue sets is used to indicate a quantity of LLID queue sets in the first data field, and one LLID queue set includes the report bitmap and the LLID report of each of the at least one LLID.

With reference to the second aspect, in a fourth possible implementation of the second aspect, that the second data field includes grant information of the at least one LLID includes the second data field includes a bandwidth grant start time and a bandwidth grant length of each of the at least one LLID.

With reference to the fourth possible implementation of the second aspect, in a fifth possible implementation of the second aspect, the second data field further includes an LLID grant bitmap and a force report bitmap. One bit in the LLID grant bitmap is used to indicate whether one of the at least one LLID has a bandwidth grant, and one bit in the force report bitmap is used to indicate whether one of the at least one LLID is forced to send a bandwidth requirement in a corresponding grant time window.

With reference to the fourth or the fifth possible implementation of the second aspect, in a sixth possible implementation of the second aspect, in the second data field, each of the at least one LLID corresponds to one bandwidth grant length.

It should be noted that bandwidth grant lengths of all of the at least one LLID are back to back, and the at least one LLID is combined to perform one burst.

With reference to any possible implementation of the second aspect, in a seventh possible implementation of the second aspect, the method further includes receiving, by the OLT, a registration request message of the ONU, where the registration request message carries a first MAC address of the ONU. The method further includes configuring, by the OLT, a first LLID for the first MAC address based on the registration request message, and sending the first LLID to the ONU. The method further includes receiving, by the OLT, a first OAM frame sent by the ONU. The first OAM frame includes another MAC address supported by the ONU; and sending, by the OLT, a second OAM frame to the ONU. The second OAM frame includes another LLID configured by the OLT for the another MAC address, and the at least one LLID is an LLID in a set including the first LLID and the another LLID.

With reference to the seventh possible implementation of the second aspect, in an eighth possible implementation of the second aspect, the ONU supports a multi-wavelength channel, and a same LLID is configured for MAC addresses of different channels associated with a same service flow.

With reference to any possible implementation of the second aspect, in a ninth possible implementation of the second aspect, the method further includes: sending, by the OLT, group information to the ONU, where the group information includes a plurality of group numbers, the number of LLIDs in each group, and an LLID in each group, where the first control frame and the second control frame each further include a first group number, where the first group number is one of the plurality of group numbers, and the at least one LLID is an LLID in a group corresponding to the first group number.

In an optional implementation, the group information is carried in a third OAM frame.

In an optional implementation, alternatively, the group information is carried in at least one MPCP frame.

An embodiment of the present invention provides an optical network unit that specifically implements a function corresponding to the foregoing optical network communication method according to the first aspect. The function may be implemented by hardware, or may be implemented by hardware executing a corresponding software program. The hardware and software include one or more unit modules corresponding to the function, and the unit module may be software and/or hardware.

According to a third aspect, in a possible design, an embodiment of the present invention provides an optical network unit. The optical network unit includes a generation unit, configured to generate a first control frame. The first control frame includes a first data field, and the first data field includes a bandwidth requirement of the at least one logical link identity LLID. The optical network unit further includes a sending unit, configured to send the first control frame to an optical line terminal OLT.

According to a fourth aspect, in a possible design, an embodiment of the present invention provides an optical network unit. The optical network unit includes an optical transceiver, a processor, and a memory that are connected to each other. The memory is configured to store program code, and the processor invokes the program code in the memory, to perform the following operations: generating a first control frame. The first control frame includes a first data field, and the first data field includes a bandwidth requirement of the at least one logical link identity LLID. The method further includes sending the first control frame to an optical line terminal OLT by using the optical transceiver.

In addition, an embodiment of the present invention provides an optical network unit that specifically implements a function corresponding to the foregoing optical network communication method according to the second aspect. The function may be implemented by hardware, or may be implemented by hardware executing a corresponding software program. The hardware and software include one or more unit modules corresponding to the function, and the unit module may be software and/or hardware.

According to a fifth aspect, in a possible design, an embodiment of the present invention provides an optical line terminal, including a generation unit, configured to generate a second control frame, where the second control frame includes a second data field, and the second data field includes grant information of the at least one LLID; and a sending unit, configured to send the second control frame to the ONU.

According to a sixth aspect, in a possible design, an embodiment of the present invention provides an optical line terminal, including: an optical transceiver, a processor, and a memory that are connected to each other. The memory is configured to store program code, and the processor invokes the program code in the memory, to perform the following operations. The operations include generating a second control frame, where the second control frame includes a second data field, and the second data field includes grant information of the at least one LLID; and sending the second control frame to the ONU by using the optical transceiver.

According to a seventh aspect, an embodiment of the present invention provides an Ethernet passive optical network EPON system. The system includes at least one optical network unit ONU and at least one optical line terminal OLT. The ONU has the function of the ONU in the optical network communication method according to the first aspect. The OLT has the function of the OLT in the optical network communication method according to the second aspect. As can be learned from the foregoing technical solutions, the solutions in the embodiments of the present invention have the following beneficial effects.

In the embodiments of the present invention, the ONU generates the first control frame, where the first control frame includes the first data field, and the first data field includes the bandwidth requirement of the at least one logical link identity LLID; and the ONU sends the first control frame to the optical line terminal OLT. In addition, the OLT generates the second control frame, where the second control frame includes the second data field, and the second data field includes the grant information of the at least one LLID; and the OLT sends the second control frame to the ONU. In the embodiments of the present invention, the first control frame may carry bandwidth requirements of a plurality of LLIDs, and a bandwidth requirement of each LLID is a sum of bandwidth requirements of uplink queues of the LLID, so that one first control frame can be used to report bandwidth requirements of a plurality of LLIDs. In addition, the second control frame in the embodiments of the present invention can be used to grant a plurality of LLIDs in one ONU, so that the MPCP frame can be fully utilized, and one frame can carry more useful information, thereby saving a bandwidth and improving bandwidth efficiency.

BRIEF DESCRIPTION OF THE DRAWINGS

FIG. 4 is a schematic diagram of a format of an MPCP frame in the current system;

FIG. 7 is a schematic diagram of a frame format of a report frame according to an embodiment of the present invention;

FIG. 8 is a schematic diagram of a frame format of a gate frame according to an embodiment of the present invention;

FIG. 9 is a schematic diagram of a frame format of a report frame carrying group information according to an embodiment of the present invention;

FIG. 10 is a schematic diagram of a frame format of a gate frame carrying group information according to an embodiment of the present invention;

FIG. 11 is a schematic frame format diagram of transferring group information by using an OAM frame according to an embodiment of the present invention;

FIG. 12 is a schematic frame format diagram of transferring group information by using an MPCP frame according to an embodiment of the present invention;

FIG. 14 is a schematic diagram of a frame format of a first OAM frame according to an embodiment of the present invention;

FIG. 15 is a schematic diagram of a frame format of a second OAM frame according to an embodiment of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

The embodiments of the present invention may be applied to a 1 G EPON, 10 G EPON, 100 G EPON, or another Ethernet passive optical network.

Figure 1:
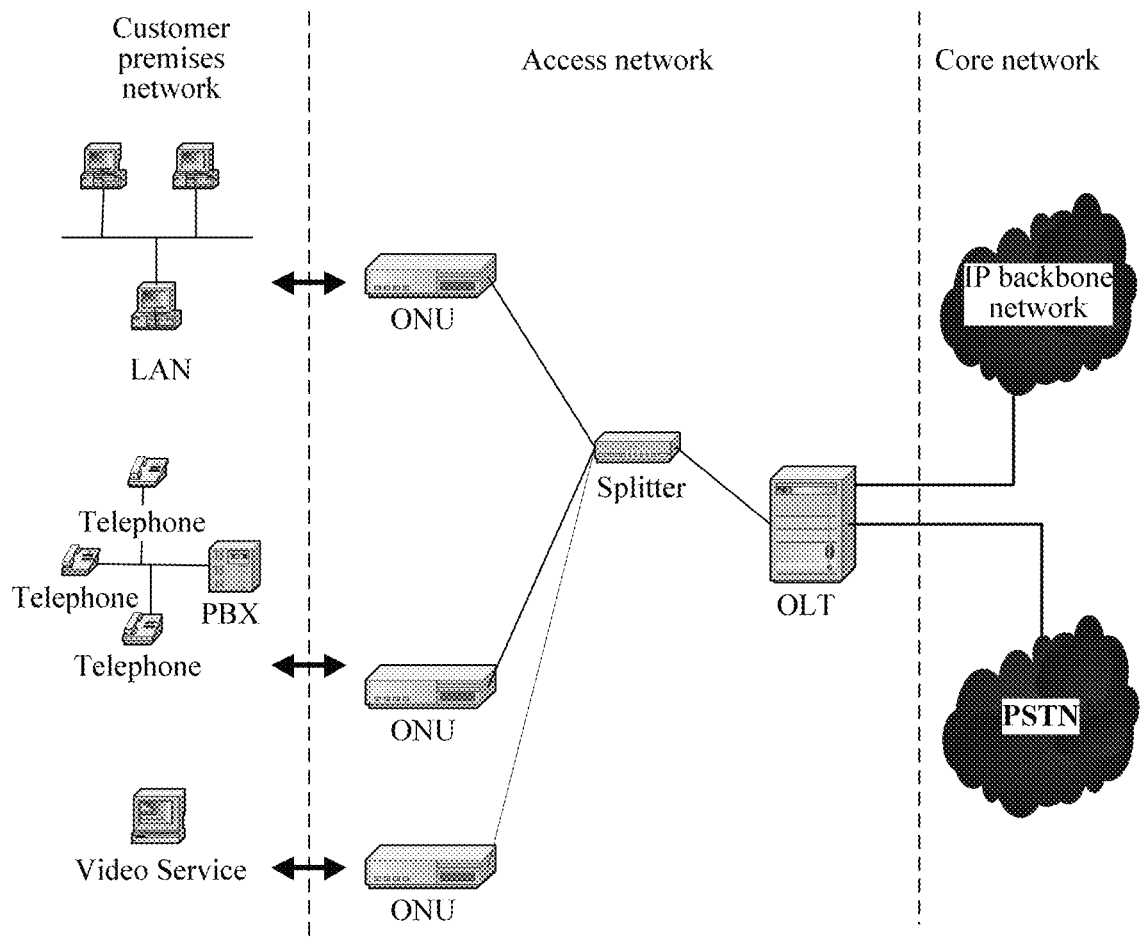
FIG. 1 is a schematic diagram of a location of an EPON system in a network according to an embodiment of the present invention.

An Ethernet passive optical network (EPON) is a network that is applied to an access network and in which a central office end device (OLT) is connected to a plurality of user end devices (ONU/ONT) by using an optical distribution network (ODN) including a passive optical cable, an optical splitter/combiner, and the like. A location of the EPON in a network is, for example, a location of an access network shown in FIG. 1, and the EPON is used to connect various terminal devices in a customer premises network to a core network.

Figure 2:
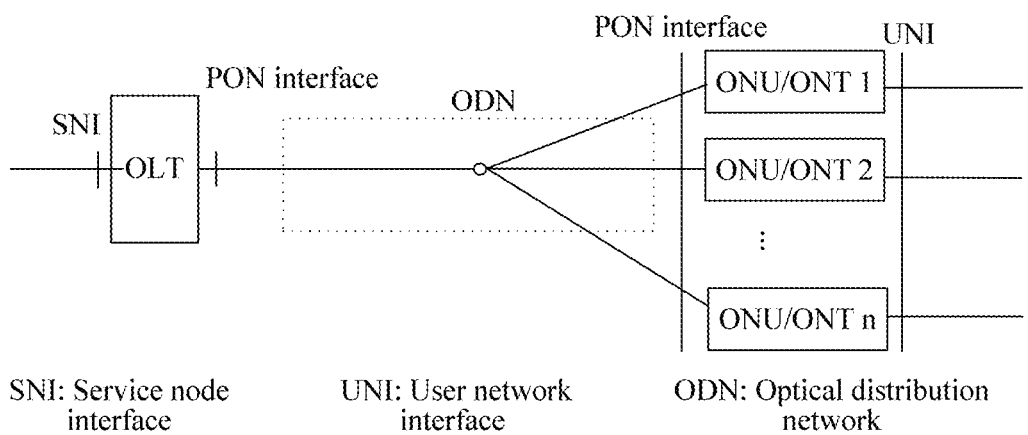
FIG. 2 is an architectural diagram of an EPON system according to an embodiment of the present invention.

A reference structure of an EPON system is shown in FIG. 2. The EPON system includes an optical line terminal (OLT) on a central office side, an optical network unit (ONU) on a user side, and an optical distribution network (ODN), and is a single-fiber bidirectional system. In a downstream direction (from the OLT to the ONU), a signal sent by the OLT reaches each ONU by using the ODN. In an upstream direction (from the ONU to the OLT), a signal sent by the ONU reaches only the OLT and does not reach another ONU. To avoid a data conflict and improve network utilization efficiency, a TDMA multiple access mode is used in the upstream direction, and data sending of each ONU is arbitrated. The optical distribution network (ODN for short) includes passive optical devices such as an optical fiber and one or more passive optical splitters, and provides an optical channel between the OLT and the ONU.

In the EPON system, the ONU has two types of LLID supporting capabilities: a single-LLID supporting capability and a multi-LLID supporting capability. During registration of the ONU, the ONU reports an LLID supporting capability of the ONU, and the OLT determines whether a single-LLID mode or a multi-LLID mode is to be used.

Figure 3:
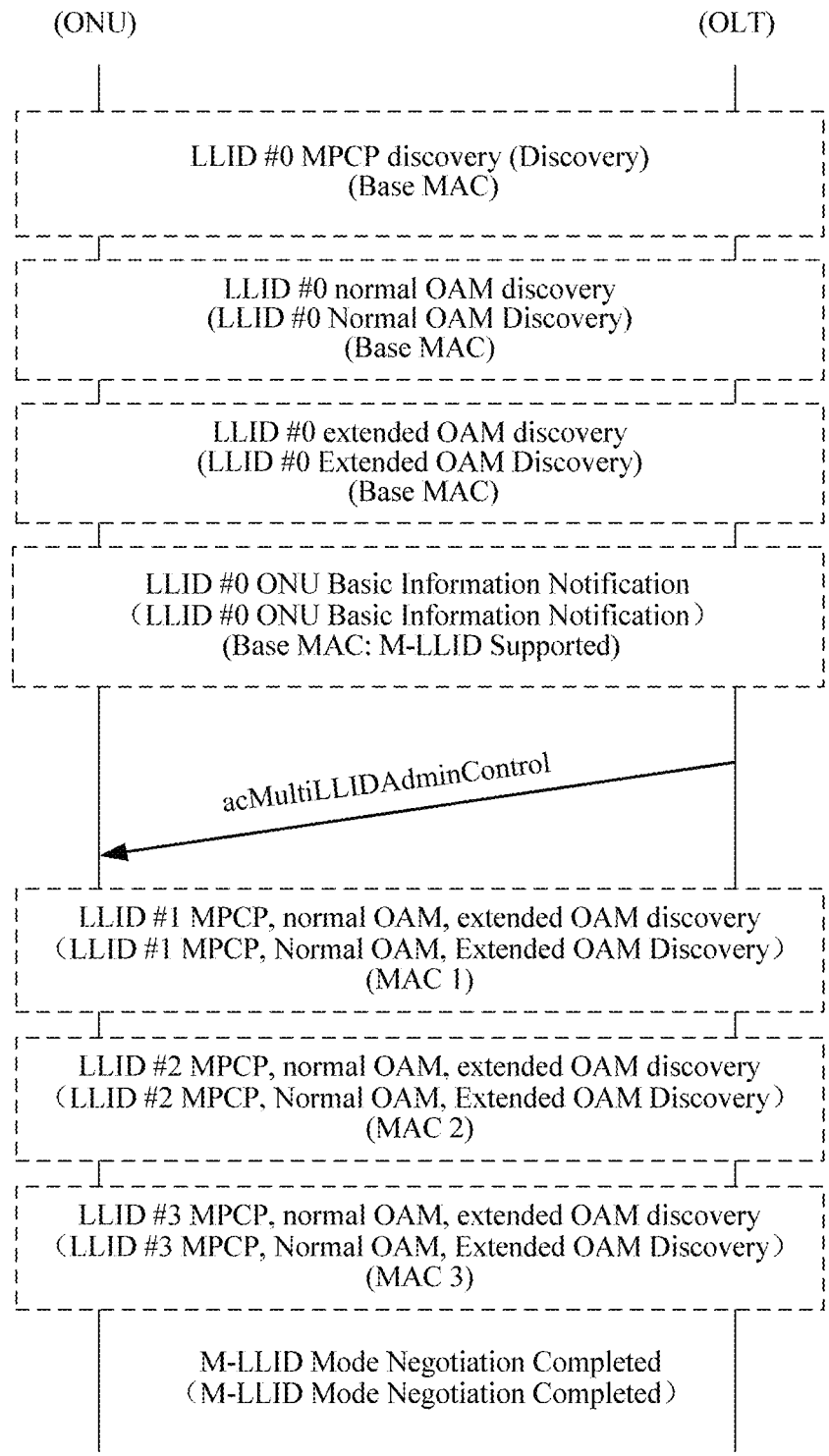
FIG. 3 is a flowchart of LLID negotiation in an ONU initialization phase in the current system.

When an ONU having a multi-LLID capability is connected to the OLT, an LLID negotiation process in an ONU initialization phase of the ONU is shown in FIG. 3.

The ONU having the multi-LLID capability has a plurality of MAC addresses. The ONU first registers by using base MAC (Base MAC, or MAC 0), and an obtained LLID is a base LLID (Base LLID). After MPCP discovery, normal operation, administration, and maintenance (OAM for short) discovery, and extended OAM discovery of the base MAC are all completed, the OLT searches for attributes of the ONU such as an ONU serial number (SN), FirmwareVer (firmware), a chip set ID, and an ONU capability. The ONU notifies, in a field "MultiLLID" of an attribute "ONU Capabilities-2", the OLT whether the ONU has the multi-LLID capability. The EPON system determines whether to work in a single-LLID mode or a multi-LLID mode.

If the EPON system is configured to be in the multi-LLID mode, the OLT sends a multi-LLID administration control (acMultiLLIDAdminControl) operation message to the ONU. After the ONU is configured to be in the multi-LLID mode, LLID registration for several other MAC addresses is completed one by one, and each MAC address needs to undergo a process of MPCP discovery, normal OAM discovery, and extended OAM discovery. If the EPON system is configured to be in the single-LLID mode, the OLT does not perform any multi-LLID related processing on the ONU (does not send an acMultiLLIDAdminControl operation message).

After the ONU completes the registration and is configured to be in the multi-LLID mode, the ONU may normally communicate with the OLT. In a multi-LLID communication scenario, MPCP control frames (mainly a gate frame and a report frame in the embodiments of the present invention) in the existing standard are shown in FIG. 4. The gate frame and the report frame in the existing standard have the following problems:

1. One MPCP control frame has 64 bytes, and different values of an operation code (Opcode) in the frame indicate different types of MPCP frames. As shown in FIG. 4, when a value of Opcode is 0x0002, the MPCP control frame is a gate frame; and when the value of Opcode is 0x0003, the MPCP control frame is a report frame. Corresponding data/pad fields (Data/Pad) in the gate frame and the report frame have different content.

As shown in FIG. 4, one gate frame can be used to grant only one LLID, and a plurality of grant lengths corresponding to one LLID are encapsulated in each gate frame. For example, four grant lengths: Grant #1 start time, Grant #1 length, . . . , Grant #4 start time, and Grant #4 length of a same LLID are encapsulated in the gate frame in FIG. 4. One report frame can be used to report a bandwidth requirement of only one LLID. For example, a plurality of queue sets (Queue Sets) of a same LLID are encapsulated in the report frame in FIG. 4, and each queue set includes a plurality of queue reports (Queue #0 report, . . . , and Queue #7 report) of the same LLID. Consequently, when the ONU having the multi-LLID capability is connected to the OLT for communication, the gate frame and the report frame need to be sent for a plurality of times, affecting bandwidth efficiency and increasing burst overheads of the MPCP frame.

2. From a perspective of engineering implementation, the solution that one gate frame carries a plurality of grants of a same LLID is applicable to a very limited quantity of cases. In an actual application, a sufficient bandwidth is usually allocated in a first grant, and therefore the solution has little actual value, resulting in a bandwidth waste.

3. In the multi-LLID mode, China Telecom requires each LLID to support a normal MPCP discovery and registration process. Therefore, a registration process in the multi-LLID mode is relatively complex, affecting bandwidth efficiency.

The embodiments of the present invention provide an Ethernet passive optical network communication method, an optical network unit, and an optical line terminal, to improve bandwidth efficiency in a multi-LLID mode in an EPON. Detailed descriptions are provided below.

In a process in which an OLT communicates with an ONU, the OLT sends a gate frame to the ONU to allocate a grant time, and the ONU sends a report frame to the OLT in a grant time window to report a bandwidth requirement. The OLT delivers the gate frame to the ONU to allocate the grant time to the ONU. In this way, a bandwidth is granted by using the gate frame, and the bandwidth requirement is reported by using the report frame. The following describes an Ethernet passive optical network communication method in an embodiment of the present invention with reference to FIG. 5.

501. An ONU generates a first control frame.

Figures 5, 6:
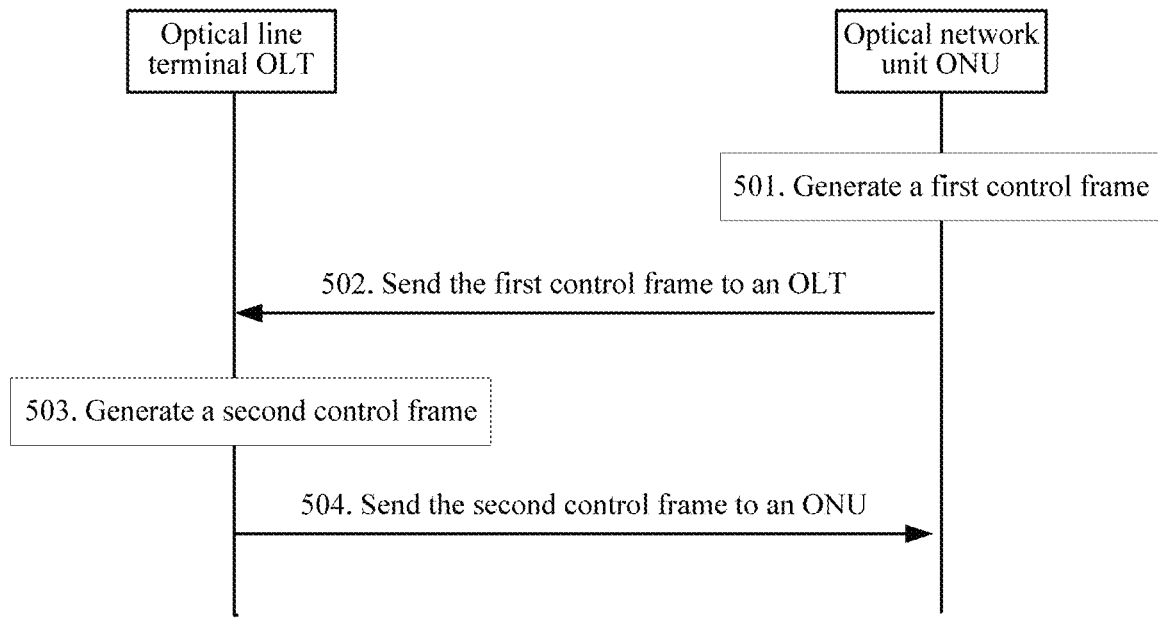
FIG. 5 is a flowchart of an Ethernet passive optical network communication method according to an embodiment of the present invention.
FIG. 6 is a schematic diagram of a format of an MPCP control frame according to an embodiment of the present invention.

A control frame in this embodiment of the present invention is an MPCP control frame. A format of the MPCP control frame is shown in FIG. 6. Meanings of all parts are shown in Table 1:

TABLE 1

| Destination address (DA) | 6 bytes | MAC-Control, or an address of a receiving device |
| Source address (SA) | 6 bytes | Address of an OLT or an ONU |
| Length/type (L/T) | 2 bytes | If <0x600, it is a length of a data field, or if ≥0x600, it is a type of the control frame |
| Operation code (Opcode) | 2 bytes | The operation code is used to identify a type of the MPCP frame |
| Data/pad (Data/Pad) | 40 bytes | Parameter + padding parts (padded with 0) |
| Verification code (FCS) | 4 bytes | |

Different values of the operation code (Opcode) in the frame indicate different types of MPCP frames.

The first control frame in this embodiment of the present invention may be a report frame. The first control frame includes a first data field, and the first data field is a data/pad field (Data/Pad) in the report frame. The first data field includes a bandwidth requirement of at least one LLID. A bandwidth requirement of each LLID includes content reported by each LLID, such as a report or a report queue cache depth.

Specifically, a format of the report frame in this embodiment of the present invention is shown in FIG. 7. Compared with the report frame shown in FIG. 4, the report frame in this embodiment of the present invention may have the following differences.

The first data field includes a report bitmap and an LLID report of each of the at least one LLID. In other words, the first data field may include a report of only one LLID, or may include reports of a plurality of LLIDs. As shown in FIG. 7, the data/pad field includes reports of n LLIDs: LLID #0 report, LLID #1 report, . . . , and LLID # n−1 report. Each LLID report carries a bandwidth requirement of one LLID. Specifically, the bandwidth requirement of the LLID carried in each LLID report is a sum of bandwidth requirements of eight queues (Queue reports).

Each bit in the report bitmap is used to indicate whether a corresponding LLID has an LLID report. In other words, one bit in the report bitmap is used to indicate whether one LLID has an LLID report. As shown in FIG. 7, the report bitmap may occupy 2 bytes (16 bits), and each of the 16 bits is used to indicate whether one LLID in the report frame has an LLID report. For example, when a first bit in the report bitmap is 0, it indicates that LLID #0 report has no LLID report; and when the first bit in the report bitmap is 1, it indicates that LLID #0 report has an LLID report.

In addition, the first data field further includes the number of queue sets (Number of queue sets), the number of queue sets is used to indicate a quantity of LLID queue sets in the first data field, and one LLID queue set includes one report bitmap and the LLID report of each of the at least one LLID. As shown in FIG. 7, a value of a bit of the number of queue sets in the first data field indicates that the first data field includes one LLID queue set.

One LLID queue set corresponds to one group of LLID report thresholds (Threshold). When one report frame includes a plurality of LLID queue sets, it indicates that each LLID has a plurality of bandwidth requirement thresholds. For example, if a value of LLID #0 report in a first LLID queue set (Set 0) is 50 M, and a value of LLID #0 report in a second LLID queue set (Set 1) is 80 M, it indicates that 50 M and 80 M are two bandwidth requirement thresholds of LLID #0, and an OLT may allocate an appropriate bandwidth to the LLID based on a bandwidth of the OLT and the bandwidth requirement thresholds of the LLID.

In this embodiment of the present invention, for a report frame in the current system, a queue report is modified to an LLID report, one report frame may carry reports of a plurality of LLIDs, and a report of each LLID is a sum of bandwidth requirements of uplink queues of the LLID. Therefore, one report frame can be used to report bandwidth requirements of a plurality of LLIDs, thereby improving bandwidth efficiency.

In addition, in this embodiment of the present invention, the report frame includes the number of queue sets, and one LLID queue set corresponds to one group of LLID report thresholds, so that concepts and usage of a report threshold and a queue set in the current system are retained, and one report frame can carry more useful information, thereby improving bandwidth efficiency.

Specifically, triggering conditions for generating the first control frame (report frame) by the ONU include but are not limited to the following several types of conditions:

1. The ONU needs to generate a report frame and send the report frame to the OLT every preset period of time. If the OLT receives, after the preset period of time, no report frame sent by the ONU, the OLT determines that the ONU has been disconnected. The preset period of time may be a preset value that is set by a system, and may be implemented by setting a timer.

2. When the ONU receives a gate frame of the OLT, if the gate frame includes an indication forcing an LLID in the ONU to report a report frame (force report), the ONU generates a report frame after receiving the gate frame.

502. The ONU sends the first control frame to an OLT.

After generating the first control frame (report frame), the ONU sends the report frame to the OLT, to request a bandwidth from the OLT.

503. The OLT generates a second control frame.

In this embodiment of the present invention, the second control frame may be a gate frame. The second control frame includes a second data field. The second data field is a data/pad field (Data/Pad) in the gate frame. The second data field includes grant information of the at least one LLID.

Triggering conditions for generating the second control frame by the OLT include but are not limited to the following condition:

After the OLT receives the report frame of the ONU, the OLT performs dynamic bandwidth allocation calculation, and then sends a gate frame to the ONU to grant a bandwidth.

Specifically, a format of the gate frame in this embodiment of the present invention is shown in FIG. 8. Compared with the gate frame shown in FIG. 4, the gate frame in this embodiment of the present invention may have the following differences.

The second data field includes a bandwidth grant start time and a bandwidth grant length of each of the at least one LLID. As shown in FIG. 8, the data/pad field includes grant lengths of n LLIDs: LLID 0 grant length, LLID 1 grant length, . . . , and LLID n−1 grant length. Each LLID corresponds to one grant length, and grant lengths of a plurality of LLIDs are closely associated with each other and are connected in series end to end (namely, b2b, back to back). The at least one LLID may be combined to perform one burst. Therefore, only one grant start time is required.

In addition, the second data field further includes an LLID grant bitmap (LLID grant bitmap) and a force report bitmap (Force report bitmap).

Each bit in the LLID grant bitmap is used to indicate whether a corresponding LLID has a grant. For example, "1" indicates that a corresponding LLID has a grant, and "0" indicates that the LLID has no grant. As shown in FIG. 8, the LLID grant bitmap may occupy 2 bytes (16 bits), and each of the 16 bits is used to indicate whether one LLID in the gate frame has a grant. For example, when a first bit in the LLID grant bitmap is 0, it indicates that LLID 0 grant length is 0, indicating that LLID 0 has no grant; and when the first bit in the LLID grant bitmap is 1, it indicates that LLID 0 grant length is not 0, indicating that LLID 0 has a grant.

Each bit in the force report bitmap is used to indicate whether a corresponding LLID is forced to report a report. To be specific, one bit in the force report bitmap is used to indicate whether one LLID is forced to send a bandwidth requirement in a corresponding grant time window.

In an EPON gate frame in the current system, a plurality of grants of a same LLID are encapsulated in one gate frame. These grants are separated, independent, and very limited in use, and have little practical value. One grant is usually encapsulated in one gate frame, and therefore there are many bytes of blank padding in the gate frame, resulting in a bandwidth waste.

The gate frame in this embodiment of the present invention can be used to grant a plurality of LLIDs in one ONU, so that an MPCP frame can be fully utilized, and one frame can carry more useful information, thereby saving a bandwidth. In addition, in this embodiment of the present invention, one LLID corresponds to one grant time window, thereby resolving a bandwidth waste problem that one gate frame carries a plurality of grants of a same LLID. In addition, in this embodiment of the present invention, grants of a plurality of LLIDs in the gate frame are back to back. Therefore, the grants of the plurality of LLIDs can be combined to perform one burst, thereby reducing burst overheads of the MPCP frame.

504. The OLT sends the second control frame to the ONU.

After generating the second control frame (gate frame), the OLT sends the gate frame to the ONU, to grant the ONU.

After receiving the gate frame sent by the OLT, the ONU performs step 501 and step 502 again, to send the report frame to the OLT to report the bandwidth requirement.

It should be noted that the step of delivering the gate frame to the ONU by the OLT and the step of reporting the report frame to the OLT by the ONU are cyclic and associated with each other. Therefore, in this embodiment of the present invention, step 501 and step 502 may be performed first, and then step 503 and step 504 are performed; or step 503 and step 504 may be performed first, and then step 501 and step 502 are performed.

In addition, after receiving the report frame sent in step 502, the OLT may grant the plurality of LLIDs in the ONU in another manner (including a manner of a gate frame in the current system).

Similarly, after receiving the gate frame in step 504 in this embodiment of the present invention, the ONU may report the bandwidth requirement in another manner (including a manner of a report frame in the current system).

In an EPON, one MPCP frame includes only 64 bytes. When the number of LLIDs supported by an ONU conflicts with a fixed 64-byte length of the MPCP frame, one MPCP frame cannot carry information about all LLIDs supported by the ONU. In this case, all the LLIDs supported by the ONU need to be divided into groups, and one group is processed in each frame, to reduce bitmap overheads and facilitate future extension.

FIG. 9 is a report frame obtained after group information is added to the report frame shown in FIG. 7. The group information is a newly added group number in the figure, and used to indicate a current group number.

FIG. 10 is a gate frame obtained after group information is added to the gate frame in FIG. 8. The group information is a newly added grant group number in the figure, and used to indicate a current grant group number.

Group Information Transfer

Because "group" is introduced in the gate frame and the report frame, a dedicated message needs to be defined, to establish or refresh an LLID group. A group may be established in the following manner: After the ONU registers with the OLT, the OLT sends the group information to the ONU. The group information includes a plurality of group numbers, the number of LLIDs in each group, and an LLID in each group. Then, the ONU stores the group information. When an LLID in the ONU is deleted, or a new LLID is connected, the OLT sends group information to the ONU to update a group.

Optionally, group information transfer manners include but are not limited to the following two manners:

(1) Transfer the Group Information by Using OAM

As shown in FIG. 11, an OAM frame has a payload (payload) of a maximum length of 1496 bytes, and therefore is sufficient to transfer a complete group. The OAM frame includes a group number (Group number), the number of LLIDs (Number of LLIDs) in the group, and LLID values (LLID 0, LLID 1, LLID 2, . . . , and LLID n−1).

(2) Transfer the Group Information by Using MPCP

Because an MPCP frame has a payload (payload) of only 40 bytes, and therefore may be insufficient to transfer a complete group. When the MPCP frame is insufficient to transfer a complete group, a plurality of MPCP frames need to be used for transfer. Therefore, the number of LLIDs and an index start value that are included in a current frame need to be transferred. As shown in FIG. 12, an MPCP frame includes a group number (Group number), the number of LLIDs (Number of LLIDs) in a group, an LLID index start value (LLID index start), the number of LLIDs (an LLID length) included in the current frame, and LLID values (LLID 0, LLID 1, LLID 2, . . . , and LLID n−1) included in the current frame.

In this embodiment of the present invention, if the ONU supports a plurality of LLIDs, when one MPCP frame cannot carry information about all the LLIDs supported by the ONU, the OLT divides all the LLIDs supported by the ONU into groups, processes one group in each frame, and defines a group information transfer message, to establish or refresh an LLID group. Therefore, an EPON protocol theory can be inherited, and the solution in this embodiment of the present invention can be further improved.

Optionally, this embodiment of the present invention can further optimize a registration procedure in a multi-LLID mode, thereby improving bandwidth efficiency.

An ONU having a multi-LLID capability has a plurality of MAC addresses. One ONU supports a plurality of channels, and each channel obtains a plurality of MAC addresses through virtualization, to indicate the number of LLIDs that can be supported by the ONU. The following describes a MAC address registration process of each channel with reference to FIG. 13, FIG. 14, and FIG. 15:

1301. The ONU registers with the OLT by using a first MAC address, to obtain a first LLID.

The first MAC address is (Base MAC, or MAC 0). Like a single-LLID ONU, the ONU performs an MPCP discovery and registration process to obtain the first LLID, referred to as a base LLID.

1302. The ONU sends a first OAM frame to the OLT, where the OAM frame includes the number of LLIDs supported by the ONU.

After obtaining the first LLID, the ONU sends the first OAM frame to the OLT, to report a capability of the ONU. A frame format of the first OAM frame is shown in FIG. 14, and the first OAM frame includes:

(1) MAC number (MAC number): the number of MAC addresses supported by the ONU, that is, the number of LLIDs that can be supported by the ONU;

(2) a registration flag (Reg flag): consistent with a frame REGISTER_REQ in an EPON standard, where when a value is 1_Register, it indicates that a MAC address attempts to register, and when the value is 3_Deregister, it indicates that the MAC address requests to re-register (deregister), and the OLT unbinds the address from an LLID; and (3) a MAC address: a 48-bit MAC address of the ONU.

As shown in FIG. 14, Reg flag 0, Reg flag 1, . . . , and Reg flag (n−1) indicate whether corresponding MAC 0, MAC 1, . . . , and MAC (n−1) request to register or deregister.

1303. The OLT sends a second OAM frame to the ONU.

After receiving the first OAM frame sent by the ONU, the OLT allocates a corresponding LLID to a MAC address in the first OAM frame based on a configuration of upper-layer software, and delivers the second OAM frame to the ONU, to configure and complete enabling and deregistration of another LLID. A frame format of the second OAM frame is shown in FIG. 15, and the second OAM frame includes:

(1) the number of LLIDs (LLID number): the number of LLIDs configured by the OLT for the ONU;

(2) a registration flag (Reg flag): whose meaning is consistent with that of a frame REGISTER in the EPON standard, where when a value is 1_Reregister, it indicates that the OLT requires the ONU to re-register; when the value is 2_Deregister, the OLT requests to release an LLID, to unbind from a bound address; when the value is 4_Ack, it indicates that the registration is successfully requested; and when the value is 5_Nack, it indicates that an upper layer rejects re-registration; and (3) LLIDs: LLID values allocated by the OLT to the ONU, for example, LLID 0, LLID 1, . . . , and LLID (n−1) shown in FIG. 15.

1304. The ONU configures an LLID based on the second OAM frame.

After configuring another LLID based on the second OAM frame, the ONU replies to the OLT with a Reregister-Ack registration success message.

In this embodiment of the present invention, an ONU having a multi-LLID capability registers by using base MAC (MAC 0), and enabling and deregistration of another LLID are configured and completed by using an OAM message. Therefore, a registration mechanism of the ONU having the multi-LLID capability can be simplified, and compared with an LLID negotiation process in an ONU initialization phase shown in FIG. 3 in the current system, this method can improve registration efficiency and bandwidth efficiency.

In addition, based on the multi-LLID supporting capability of the ONU, embodiments of the present invention can further implement channel bonding by using a cross-wavelength LLID that may be generated by a plurality of LLIDs.

Figure 13:
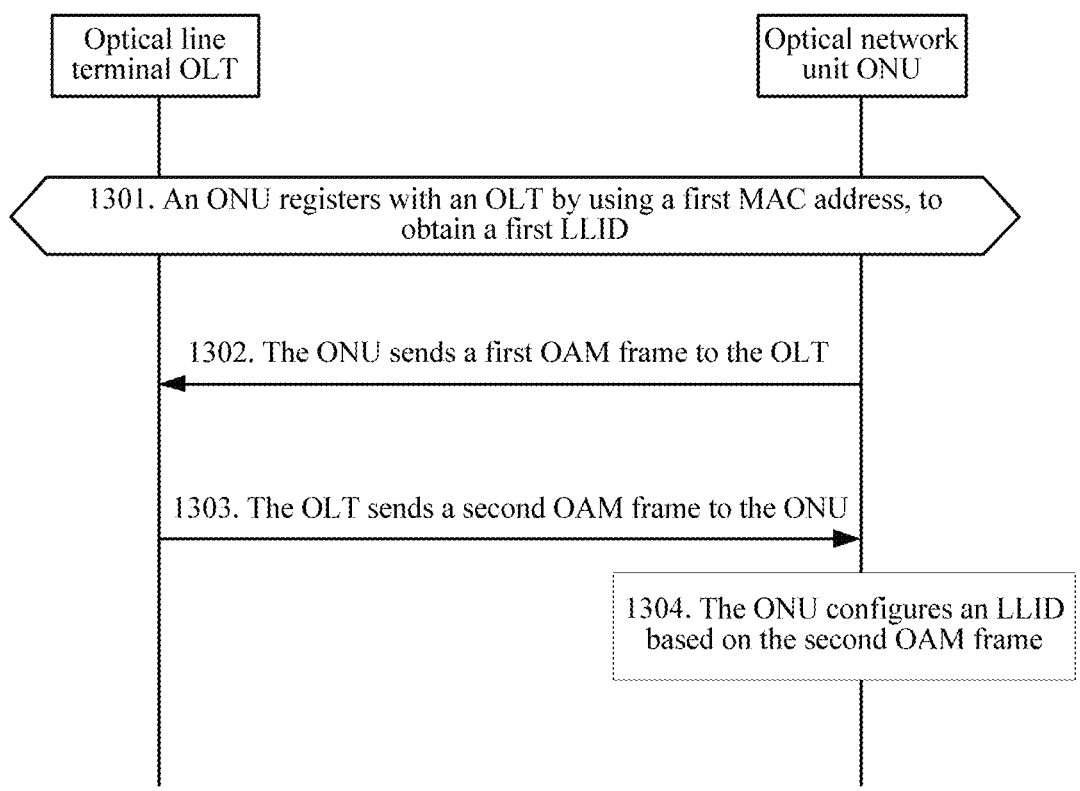
FIG. 13 is a flowchart of multi-LLID registration according to an embodiment of the present invention.
Figure 16:
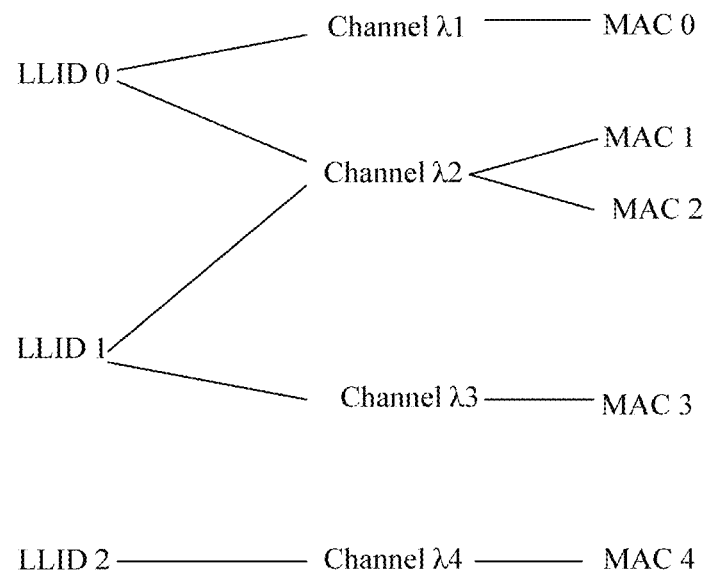
FIG. 16 is a schematic diagram of binding an LLID and a wavelength channel according to an embodiment of the present invention.

One ONU supports a plurality of wavelength channels (briefly referred to as channels). For example, in a 100 G EPON, if four wavelength channels ($\lambda1, \lambda2, \lambda3$, and $\lambda4$) are supported, each wavelength channel obtains a plurality of MAC addresses through virtualization. The LLID registration process shown in FIG. 13 to FIG. 15 is single-channel LLID registration. In a registration process, based on a system configuration, MAC addresses of channels associated with a same service flow may be registered to obtain a same LLID, as shown in FIG. 16:

A same LLID, namely, LLID 0, is configured for MAC 0 of the channel λ1 and MAC 1 of the channel λ2. A same LLID, namely, LLID 1, is configured for MAC 2 of the channel λ2 and MAC 3 of the channel λ3. LLID 2 is configured for MAC4 of the channel λ4.

Service flow (Service Flow) mapping is performed based on a service bandwidth requirement, for example:
service flow #1 needs a bandwidth of 30 Gbps;
service flow #2 needs a bandwidth of 30 Gbps; and
service flow #$_3$ needs a bandwidth of 25 Gbps.

In this case, channel mapping may be performed by using a mapping rule shown in the following Table 2:

TABLE 2

| Service flow | LLID |
|---|---|
| #1 | LLID 0 |
| #2 | LLID 1 |
| #3 | LLID 2 |

In such a mapping manner, service flow #1 is mapped to LLID 0, and LLID 0 is configured for MAC 0 of the channel λ1 and MAC 1 of the channel λ2, so that the bandwidth of 30 Gbps of service flow #1 may be offloaded to the channel λ1 and the channel λ2. Similarly, service flow #2 is mapped to LLID 1, and LLID 1 is configured for MAC 2 of the channel λ2 and MAC 3 of the channel λ$_3$, so that the bandwidth of 30 Gbps of service flow #2 may be offloaded to the channel λ2 and the channel λ$_3$. In this way, a peak bandwidth of a single user can be increased by using a cross-wavelength channel LLID.

After channel bonding is implemented by using the cross-wavelength LLID that may be generated by a plurality of LLIDs, during service provisioning, the OLT configures a dynamic bandwidth allocation (DBA) template based on a service requirement. A plurality of DBA templates need to be configured for a service carried by bound channels. A DBA template is bound to a corresponding LLID (carrying wavelength or MAC address information), a service flow is associated with the corresponding LLID, and a system performs gate grant and report reporting based on the LLID.

Based on the system configuration, for the bound channels, a same LLID is allocated to different MAC addresses. The bound channels are identified by using the same LLID without requiring any additional channel bonding message. Joint DBA calculation is performed for the bound channels, and a calculation result is delivered by using respective gate messages of the channels. Bandwidth allocation gate messages for a same LLID but for different MAC addresses may be distinguished from each other based on the MAC addresses.

In this embodiment of the present invention, the cross-wavelength LLID that may be generated by a plurality of LLIDs can be used to implement channel bonding, so that a same service flow can be offloaded to different channels, thereby increasing a peak bandwidth of a single user.

The Ethernet passive optical network communication method in the multi-LLID mode in the embodiments of the present invention is described above. The following describes the optical network unit ONU and the optical line terminal OLT in the embodiments of the present invention.

Figure 17:
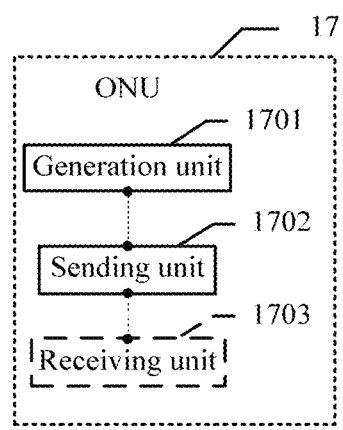
FIG. 17 is a schematic structural diagram of function modules of an optical network unit according to an embodiment of the present invention.

FIG. 17 is a structural diagram of function modules of an optical network unit ONU according to an embodiment of the present invention. The ONU specifically corresponds to a function of the ONU in the foregoing method embodiments (the embodiments shown in FIG. 5 to FIG. 15). The function may be implemented by hardware, or may be implemented by hardware executing a corresponding software program. The hardware and software include one or more unit modules corresponding to the function, and the unit module may be software and/or hardware.

The ONU specifically includes a generation unit 1701, configured to generate a first control frame, where the first control frame includes a first data field, and the first data field includes a bandwidth requirement of at least one logical link identity LLID; and a sending unit 1702, configured to send the first control frame to an optical line terminal OLT.

In some specific implementations, the ONU further include a receiving unit 1703, configured to receive a second control frame sent by the OLT, where the second control frame includes a second data field, and the second data field includes grant information of the at least one LLID.

In some specific implementations, the first data field in the first control frame generated by the generation unit 1701 includes a report bitmap (Report bitmap) and an LLID report (LLID report) of each of the at least one LLID, where one bit in the report bitmap is used to indicate whether one of the at least one LLID has an LLID report.

In some specific implementations, the first data field in the first control frame generated by the generation unit 1701 further includes the number of queue sets (Number of queue sets), where the number of queue sets is used to indicate a quantity of LLID queue sets in the first data field, and one LLID queue set includes the report bitmap and the LLID report of each of the at least one LLID.

In some specific implementations, the second data field in the second control frame received by the receiving unit 1703 includes a bandwidth grant start time (Grant start time) and a bandwidth grant length (Grant length) of each of the at least one LLID.

In some specific implementations, the second data field in the second control frame received by the receiving unit 1703 further includes an LLID grant bitmap (LLID grant bitmap) and a force report bitmap (Force report bitmap), where one bit in the LLID grant bitmap is used to indicate whether one of the at least one LLID has a bandwidth grant, and one bit in the force report bitmap is used to indicate whether one of the at least one LLID is forced to send a bandwidth requirement in a corresponding grant time window.

In some specific implementations, in the second data field in the second control frame received by the receiving unit 1703, each of the at least one LLID corresponds to one bandwidth grant length.

In some specific implementations, the ONU further includes a first LLID obtaining unit, configured to register with the OLT by using a first MAC address, to obtain a first LLID; a first OAM frame sending unit, configured to send a first OAM frame to the OLT, where the first OAM frame includes another MAC address supported by the ONU; a second OAM frame receiving unit, configured to receive a second OAM frame sent by the OLT, where the second OAM frame includes another LLID configured by the OLT for the another MAC address; and an LLID configuration unit, configured to configure the another LLID based on the second OAM frame, where the at least one LLID is an LLID in a set including the first LLID and the another LLID.

In some specific implementations, the ONU further includes: a group information receiving unit, configured to receive group information sent by the OLT, where the group information includes a plurality of group numbers, the number of LLIDs in each group, and an LLID in each group;

and a storage unit, configured to store the group information, where the first control frame and the second control frame each further include a first group number, where the first group number is one of the plurality of group numbers, and the at least one LLID is an LLID in a group corresponding to the first group number.

Figure 18:
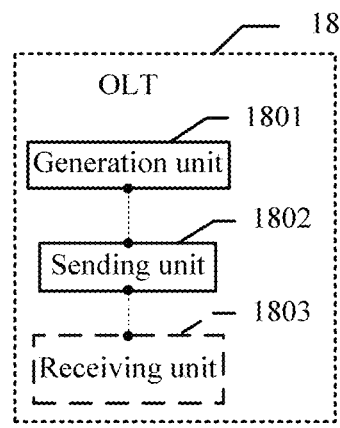
FIG. 18 is a schematic structural diagram of function modules of an optical line terminal according to an embodiment of the present invention.

FIG. 18 is a structural diagram of function modules of an optical network terminal OLT according to an embodiment of the present invention. The OLT specifically corresponds to a function of the OLT in the foregoing method embodiments (the embodiments shown in FIG. 5 to FIG. 15). The function may be implemented by hardware, or may be implemented by hardware executing a corresponding software program. The hardware and software include one or more unit modules corresponding to the function, and the unit module may be software and/or hardware.

The OLT specifically includes: a generation unit 1801, configured to generate a second control frame, where the second control frame includes a second data field, and the second data field includes grant information of at least one LLID; and a sending unit 1802, configured to send the second control frame to an ONU.

In some specific implementations, the OLT further includes: a receiving unit 1803, configured to receive a first control frame sent by the ONU, where the first control frame includes a first data field, and the first data field includes a bandwidth requirement of the at least one LLID.

In some specific implementations, the first data field in the first control frame received by the receiving unit includes a report bitmap (Report bitmap) and an LLID report (LLID report) of each of the at least one LLID, where one bit in the report bitmap is used to indicate whether one of the at least one LLID has an LLID report.

In some specific implementations, the first data field in the first control frame received by the receiving unit further includes the number of queue sets (Number of queue sets), where the number of queue sets is used to indicate a quantity of LLID queue sets in the first data field, and one LLID queue set includes the report bitmap and the LLID report of each of the at least one LLID.

In some specific implementations, the second data field in the second control frame generated by the generation unit 1801 includes a bandwidth grant start time (Grant start time) and a bandwidth grant length (Grant length) of each of the at least one LLID.

In some specific implementations, the second data field in the second control frame generated by the generation unit 1801 further includes an LLID grant bitmap (LLID grant bitmap) and a force report bitmap (Force report bitmap), where one bit in the LLID grant bitmap is used to indicate whether one of the at least one LLID has a bandwidth grant, and one bit in the force report bitmap is used to indicate whether one of the at least one LLID is forced to send a bandwidth requirement in a corresponding grant time window.

In some specific implementations, in the second data field, each of the at least one LLID corresponds to one bandwidth grant length.

In some specific implementations, the receiving unit 1803 is further configured to receive a registration request message of the ONU, where the registration request message carries a first MAC address of the ONU. The OLT further includes: a first LLID configuration unit, configured to configure a first LLID for the first MAC address based on the registration request message, where the sending unit is further configured to send the first LLID to the ONU; a first OAM frame receiving unit, configured to receive a first OAM frame sent by the ONU, where the first OAM frame includes another MAC address supported by the ONU; and a second OAM frame sending unit, configured to send a second OAM frame to the ONU, where the second OAM frame includes another LLID configured by the OLT for the another MAC address. The at least one LLID is an LLID in a set including the first LLID and the another LLID.

In some specific implementations, the OLT further includes a group information sending unit, configured to send group information to the ONU, where the group information includes a plurality of group numbers, the number of LLIDs in each group, and an LLID in each group. The first control frame and the second control frame each further include a first group number, where the first group number is one of the plurality of group numbers, and the at least one LLID is an LLID in a group corresponding to the first group number.

For information exchange between the function modules of the ONU shown in FIG. 17 and information exchange between the function modules of the OLT shown in FIG. 18, refer to the descriptions in the foregoing method embodiments (the embodiments shown in FIG. 5 to FIG. 15). Details are not described herein again.

Figure 19:
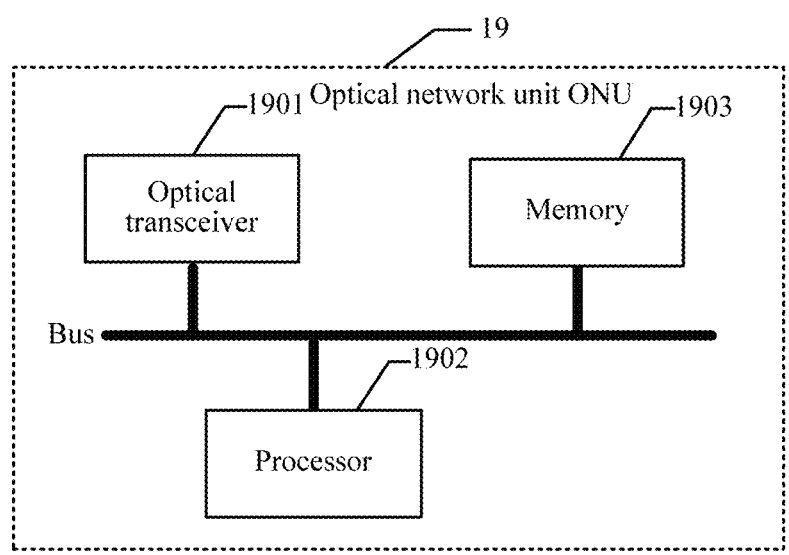
FIG. 19 is a schematic diagram of a hardware structure of an optical network unit according to an embodiment of the present invention.

In addition, embodiments of the present invention further includes an EPON system. For a structure of the EPON system, refer to FIG. 2 and the description of FIG. 2. An ONU and an OLT in the system in this embodiment of the present invention respectively have the functions of the ONU and the OLT described in the foregoing method embodiments (the embodiments shown in FIG. 5 to FIG. 15). Details are not described herein again. FIG. 19 is a schematic diagram of a hardware structure of an ONU according to an embodiment of the present invention. The ONU may include an optical transceiver (TRX: Transceiver) 1901, one or more processors (CPU for short) 1902, and a memory 1903.

The optical transceiver 1901 is configured to receive or send an optical signal from or to an optical transceiver of an OLT.

The memory 1903 is configured to store an application program, or data during running of the processor 1902. The program stored in the memory 1903 may include one or more modules (not shown in the figure), and each module may include a series of instructions and operations.

The processor 1902 may communicate with the memory 1903, to perform a series of instructions and operations in the memory 1903, and specifically, perform all or some steps performed by the ONU in the foregoing method embodiments (the embodiments shown in FIG. 5 to FIG. 15). For details, refer to the method embodiments shown in FIG. 5 to FIG. 15.

Figure 20:
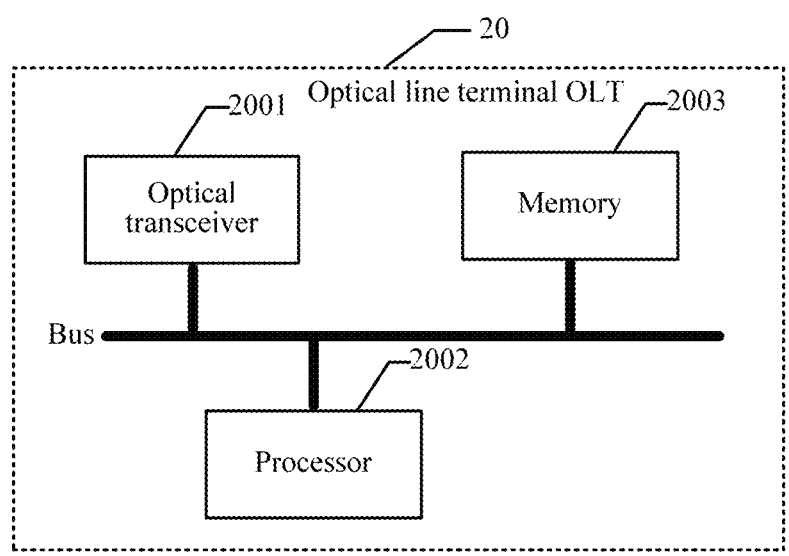
FIG. 20 is a schematic diagram of a hardware structure of an optical line terminal according to an embodiment of the present invention.

FIG. 20 is a schematic diagram of a hardware structure of an OLT according to an embodiment of the present invention. The OLT may include an optical transceiver (TRX: Transceiver) 2001, one or more processors (CPU for short) 2002, and a memory 2003.

The optical transceiver 2001 is configured to receive or send an optical signal from or to an optical transceiver of an ONU.

The memory 2003 is configured to store an application program, or data during running of the processor 2002. The program stored in the memory 2003 may include one or more modules (not shown in the figure), and each module may include a series of instructions and operations.

In an actual application, the processor may be a PON MAC chip, and communicate with the memory 2003, to perform a series of instructions and operations in the memory 2003, and specifically, perform all or some steps performed by the OLT in the foregoing method embodiments (the embodiments shown in FIG. 5 to FIG. 15). For details, refer to the method embodiments shown in FIG. 5 to FIG. 15.

Embodiments of the present invention further provides a computer storage medium. The medium stores a program, and when the program is executed, some or all steps of the method in the foregoing (embodiments shown in FIG. 5 to FIG. 15) are performed.

In the foregoing embodiments, the descriptions of the embodiments have respective focuses. For a part that is not described in detail in an embodiment, refer to related descriptions in other embodiments.

It may be clearly understood by a person skilled in the art that, for the purpose of convenient and brief description, for a detailed working process of the foregoing described system, apparatus, and unit, reference may be made to a corresponding process in the foregoing method embodiments, and details are not described herein again.

In the specification, claims, and accompanying drawings, the terms "first", "second", "third", "fourth", and the like (if existent) are intended to distinguish between similar objects but do not necessarily indicate a specific order or sequence. It should be understood that the data termed in such a way is interchangeable in proper circumstances so that the embodiments of the present invention described herein can be implemented in other orders than the order illustrated or described herein. Moreover, the terms "include", "contain", and any other variants thereof are intended to cover the non-exclusive inclusion. For example, a process, method, system, product, or device that includes a series of steps or units is not necessarily limited to those steps or units that are expressly listed, but may include other steps or units that are not expressly listed or are inherent to such a process, method, system, product, or device.

In the several embodiments provided in this application, it should be understood that the disclosed system, apparatus, and method may be implemented in other manners. For example, the described apparatus embodiments are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

In addition, function units in the embodiments of the present invention may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions in the embodiments present invention essentially, or the part contributing to the current system, or all or some of the technical solutions may be implemented in the form of a software product. The computer software product is stored in a storage medium and includes several instructions for instructing a computer device (which may be a personal computer, a server, a network device, or the like) to perform all or some of the steps of the method described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

In this specification, specific examples are used to describe the principle and implementations of the present invention, and the descriptions of the embodiments are only intended to help understand the method and core idea of the present invention. Meanwhile, a person of ordinary skill in the art may make, based on the idea of the present invention, modifications with respect to the specific implementations and the application scope. Therefore, the content of this specification shall not be construed as a limitation to the present invention.

What is claimed is:
1. A method, comprising:
generating, by an optical network unit (ONU) in a passive optical network, a first control frame, wherein the first control frame comprises a first data field, and the first data field comprises a bandwidth requirement of at least one logical link identity (LLID) corresponding to the ONU;
sending, by the ONU, the first control frame to an optical line terminal (OLT); and
receiving, by the ONU, a second control frame sent by the OLT, wherein the second control frame comprises a second data field, and the second data field comprises grant information of a group, wherein the group comprises the at least one LLID;
wherein the second data field further comprises a bandwidth grant start time, a bandwidth grant length of each of the at least one LLID, and an LLID grant bitmap and a force report bitmap, wherein one bit in the LLID grant bitmap indicates whether one of the at least one LLID has a bandwidth grant, and one bit in the force report bitmap indicates whether one of the at least one LLID is forced to send a bandwidth requirement in a corresponding grant time window.

2. The method according to claim 1, wherein:
the first data field comprises a report bitmap and an LLID report of each of the at least one LLID, wherein one bit in the report bitmap indicates whether one of the at least one LLID has an LLID report.

3. The method according to claim 2, wherein:
the first data field further comprises a number of queue sets, wherein the number of queue sets indicates a quantity of LLID queue sets in the first data field, and each LLID queue set comprises a respective report bitmap and a respective LLID report of a respective one of the at least one LLID.

4. The method according to claim 1, wherein the method further comprises:
receiving, by the ONU, group information sent by the OLT, wherein the group information comprises a plurality of group numbers identifying a plurality of groups, a number of LLIDs in each group of the plurality of groups, and an LLID in each group of the plurality of groups; and storing, by the ONU, the group information, wherein:

the first control frame and the second control frame each further comprise a first group number, wherein the first group number is one of the plurality of group numbers, and the at least one LLID is in a first group of the plurality of groups, the first group corresponds to the first group number.

5. The method according to claim 1, wherein the method further comprises:

registering, by the ONU, with the OLT using a first MAC address, to obtain a first LLID;

sending, by the ONU, a first operation, administration, and maintenance (OAM) frame to the OLT, wherein the first OAM frame comprises another MAC address supported by the ONU;

receiving, by the ONU, a second OAM frame sent by the OLT, wherein the second OAM frame comprises another LLID configured by the OLT for the another MAC address; and configuring, by the ONU, the another LLID according to the second OAM frame, wherein:

the at least one LLID comprises the first LLID and the another LLID.

6. A method, comprising:

receiving, by an optical line terminal (OLT) in a passive optical network, a first control frame sent by an optical network unit (ONU), wherein the first control frame comprises a first data field, and the first data field comprises a bandwidth requirement of at least one logical link identity (LLID);

generating, by the OLT, a second control frame, wherein the second control frame comprises a second data field, and the second data field comprises grant information of a group, wherein the group comprises the at least one LLID corresponding to the ONU, wherein the second data field further comprises a bandwidth grant start time, a bandwidth grant length of each of the at least one LLID, and an LLID grant bitmap and a force report bitmap, wherein one bit in the LLID grant bitmap indicates whether one of the at least one LLID has a bandwidth grant, and one bit in the force report bitmap indicates whether one of the at least one LLID is forced to send a bandwidth requirement in a corresponding grant time window; and sending, by the OLT, the second control frame to the ONU.

7. The method according to claim 6, wherein:

the first data field comprises a report bitmap and an LLID report of each of the at least one LLID, wherein one bit in the report bitmap indicates whether one of the at least one LLID has an LLID report.

8. The method according to claim 6, wherein the first data field further comprises a number of queue sets, wherein the number of queue sets indicates a quantity of LLID queue sets in the first data field, and each LLID queue set comprises a respective report bitmap and a respective LLID report of a respective one of the at least one LLID.

9. The method according to claim 6, wherein the method further comprises:

sending, by the OLT, group information to the ONU, wherein the group information comprises a plurality of group numbers identifying a plurality of groups, a number of LLIDs in each group of the plurality of groups, and an LLID in each group of the plurality of groups, wherein the first control frame and the second control frame each further comprise a first group number, wherein the first group number is one of the plurality of group numbers, and the at least one LLID is in a first group of the plurality of groups, the first group corresponds to the first group number.

10. The method according to claim 6, wherein the method further comprises:

receiving, by the OLT, a registration request message of the ONU, wherein the registration request message carries a first MAC address of the ONU;

configuring, by the OLT, a first LLID for the first MAC address according to the registration request message;

sending the first LLID to the ONU;

receiving, by the OLT, a first OAM frame sent by the ONU, wherein the first OAM frame comprises another MAC address supported by the ONU; and sending, by the OLT, a second OAM frame to the ONU, wherein the second OAM frame comprises another LLID configured by the OLT for the another MAC address, wherein:

the at least one LLID comprises the first LLID and the another LLID.

11. A device, comprising:

a generation unit, configured to generate a first control frame, wherein the first control frame comprises a first data field, and the first data field comprises a bandwidth requirement of at least one logical link identity (LLID) corresponding to an optical network unit (ONU);

a sending unit, configured to send the first control frame to an optical line terminal (OLT), wherein the generation unit and the sending unit are comprised in the ONU; and a receiving unit, configured to receive a second control frame sent by the OLT, wherein the second control frame comprises a second data field, and the second data field comprises grant information of a group, wherein the group comprises the at least one LLID, wherein the second data field further comprises a bandwidth grant start time, a bandwidth grant length of each of the at least one LLID, and an LLID grant bitmap and a force report bitmap, wherein one bit in the LLID grant bitmap indicates whether one of the at least one LLID has a bandwidth grant, and one bit in the force report bitmap indicates whether one of the at least one LLID is forced to send a bandwidth requirement in a corresponding grant time window.

12. A device, comprising:

a receiving unit, configured to receive a first control frame sent by an optical network unit (ONU), wherein the first control frame comprises a first data field, and the first data field comprises a bandwidth requirement of at least one logical link identity (LLID);

a generation unit, configured to generate a second control frame, wherein the second control frame comprises a second data field, and the second data field comprises grant information of a group, wherein the group comprises the at least one LLID corresponding to the ONU, wherein the second data field further comprises a bandwidth grant start time, a bandwidth grant length of each of the at least one LLID, and an LLID grant bitmap and a force report bitmap, wherein one bit in the LLID grant bitmap indicates whether one of the at least one LLID has a bandwidth grant, and one bit in the force report bitmap indicates whether one of the at least one LLID is forced to send a bandwidth requirement in a corresponding grant time window; and a sending unit, configured to send the second control frame to the ONU, wherein the generation unit and the sending unit are comprised in an optical line terminal.

13. A device, comprising:

an optical transceiver, a processor, and a non-transitory computer readable storage medium that are connected to each other, wherein:

the non-transitory computer readable storage medium is configured to store program code, and the processor invokes the program code in the non-transitory computer readable storage medium, to perform the following operations:

generate a first control frame, wherein the first control frame comprises a first data field, and the first data field comprises a bandwidth requirement of at least one logical link identity (LLID) corresponding to the device;

send the first control frame to an optical line terminal (OLT) through the optical transceiver, wherein the optical transceiver, the processor, and the non-transitory computer readable storage medium are comprised in an optical network unit (ONU); and receive a second control frame sent by the OLT, wherein the second control frame comprises a second data field, and the second data field comprises grant information of a group, wherein the group comprises the at least one LLID, wherein the second data field further comprises a bandwidth grant start time, a bandwidth grant length of each of the at least one LLID, and an LLID grant bitmap and a force report bitmap, wherein one bit in the LLID grant bitmap indicates whether one of the at least one LLID has a bandwidth grant, and one bit in the force report bitmap indicates whether one of the at least one LLID is forced to send a bandwidth requirement in a corresponding grant time window.

14. A device, comprising an optical transceiver, a processor, and a non-transitory computer readable storage medium that are connected to each other, wherein the non-transitory computer readable storage medium is configured to store program code, and the processor invokes the program code in the non-transitory computer readable storage medium, to perform the following operations:

receiving a first control frame sent by an optical network unit (ONU), wherein the first control frame comprises a first data field, and the first data field comprises a bandwidth requirement of at least one logical link identity (LLID);

generate a second control frame, wherein the second control frame comprises a second data field, and the second data field comprises grant information of a group, wherein the group comprises the at least one LLID corresponding to the ONU, wherein the second data field further comprises a bandwidth grant start time, a bandwidth grant length of each of the at least one LLID, and an LLID grant bitmap and a force report bitmap, wherein one bit in the LLID grant bitmap indicates whether one of the at least one LLID has a bandwidth grant, and one bit in the force report bitmap indicates whether one of the at least one LLID is forced to send a bandwidth requirement in a corresponding grant time window; and send the second control frame to the ONU through the optical transceiver wherein the optical transceiver, the processor, and the non-transitory computer readable storage medium are comprised in an optical line terminal (OLT).

15. A system, comprising an optical network unit (ONU) and an optical line terminal (OLT) in a passive optical network, wherein:

the ONU comprises:

a generation unit, configured to generate a first control frame, wherein the first control frame comprises a first data field, and the first data field comprises a bandwidth requirement of at least one logical link identity (LLID) corresponding to the ONU;

a sending unit, configured to send the first control frame to an optical line terminal (OLT); and a receiving unit, configured to receive a second control frame sent by the OLT, wherein the second control frame comprises a second data field, and the second data field comprises grant information of a group, wherein the group comprises the at least one LLID; and the OLT comprises:

a receiving unit, configured to receive a first control frame sent by the ONU;

a generation unit, configured to generate a second control frame, wherein the second control frame comprises a second data field, and the second data field comprises grant information of the at least one LLID, wherein the second data field further comprises a bandwidth grant start time, a bandwidth grant length of each of the at least one LLID, and an LLID grant bitmap and a force report bitmap, wherein one bit in the LLID grant bitmap indicates whether one of the at least one LLID has a bandwidth grant, and one bit in the force report bitmap indicates whether one of the at least one LLID is forced to send a bandwidth requirement in a corresponding grant time window; and a sending unit, configured to send the second control frame to the ONU.

* * * * *